United States Patent [19]

Rabain et al.

[11] Patent Number: 4,578,817
[45] Date of Patent: Mar. 25, 1986

[54] METHOD FOR ESTABLISHING COMMUNICATIONS IN A NETWORK OF FREQUENCY-JUMPING TRANSMITTER-RECEIVER STATIONS AND A STATION FOR THE UTILIZATION OF SAID METHOD

[75] Inventors: Jacques Rabain; Serge Adrian, both of Paris, France

[73] Assignee: Thomson-CSF, Paris, France

[21] Appl. No.: 449,215

[22] Filed: Dec. 13, 1982

[30] Foreign Application Priority Data

Dec. 15, 1981 [FR] France .................. 81 23441

[51] Int. Cl.$^4$ .............................................. H04K 1/00
[52] U.S. Cl. ...................................... 455/27; 375/2.1; 178/22.17
[58] Field of Search ............................. 375/1, 2.1, 2.2; 455/27, 32; 178/22.17

[56] References Cited

U.S. PATENT DOCUMENTS

| | | | |
|---|---|---|---|
| 4,013,958 | 3/1977 | Spayth ................................. | 455/32 |
| 4,193,030 | 3/1980 | Rabow et al. ........................ | 375/2.2 |
| 4,308,617 | 12/1981 | German, Jr. ......................... | 375/1 |
| 4,320,514 | 3/1982 | Haskell ................................ | 375/1 |
| 4,341,925 | 7/1982 | Doland ............................ | 178/22.17 |
| 4,383,323 | 5/1983 | Timor .................................. | 375/1 |
| 4,476,566 | 10/1984 | Dent .................................. | 375/2.2 |
| 4,479,226 | 10/1984 | Prabhu et al. ....................... | 455/27 |

FOREIGN PATENT DOCUMENTS 2650823  6/1976  Fed. Rep. of Germany .

Primary Examiner—Salvatore Cangialosi
Attorney, Agent, or Firm—Oblon, Fisher, Spivak, McClelland & Maier

[57] ABSTRACT

In order to establish communications in a conference network of transmitter-receiver stations, each station establishes a frequency-jumping standby law while a calling station transmits a frequency-diversity call sequence on said standby law and the other stations are listening in accordance with said standby law. Furthermore, each station establishes a second frequency law which is synchronous with the standby law but the stair-steps of which are of longer duration. At the end of a call sequence, the calling station and the stations which have detected this sequence are put in the listening state over a time interval $t_1$ at the corresponding possible traffic frequency of the second frequency law. Each station which has detected a signal then transmits a jamming signal over a time interval $t_2$ at the aforementioned traffic frequency and the stations which have not detected any signal extend the listening period by the same time interval $t_2$. Non-reception of a signal during the time interval $t_2$ makes it possible to establish a communication at the corresponding frequency.

6 Claims, 4 Drawing Figures

METHOD FOR ESTABLISHING COMMUNICATIONS IN A NETWORK OF FREQUENCY-JUMPING TRANSMITTER-RECEIVER STATIONS AND A STATION FOR THE UTILIZATION OF SAID METHOD

This invention relates to a method for establishing communications in a network of transmitter-receiver stations designed for the alternate transmission procedure known as simplex transmission, a frequency jump for changing the traffic frequency being performed at each alternate transmission or simplex operation in the case of all stations which are in communication with each other in order to protect communications against countermeasures.

The frequency selected for establishing communications must first be tested and found to be free by all receivers in order to ensure that said frequency can be used as a traffic frequency for the corresponding period of the alternate transmission, this free frequency search being necessarily performed at each stage of the alternate transmission. In fact, if the stations are located at a sufficient distance from each other, their electrical environment is different and a conference cannot be complete unless the frequency chosen for a communication has been tested and found to be free at the level of all the receivers which form the network.

This initial connection therefore presupposes a preliminary exchange of information between all the stations of the network. This exchange must be of sufficiently short duration to be imperceptible to the operator and to permit a search for another free frequency at each simplex operation.

The invention is therefore directed to a method of establishment of communications which offers these characteristics.

In accordance with the invention, a method for establishing communications in a conference network of transmitter-receiver stations designed for communication by simplex transmission is primarily distinguished by the fact that, in the standby position, the stations in the listening state follow the same first frequency law or so-called standby law which varies in jumps in a pseudorandom manner.

Another distinctive feature lies in the fact that, at the time of each simplex operation, the station in the call position establishes a call sequence formed of call messages transmitted in frequency diversity on the stair-steps of said standby law. At the end of said call sequence, said station is put in the listening state at the possible traffic frequency corresponding to the current stair-step of a second frequency law which is similar for all stations. Said second law varies in jumps in a pseudo-random manner and is synchronized with the first law, the time-duration of the stair-steps of the second law being a multiple of the time-duration of the stair-steps of the standby law.

Yet another feature of the invention lies in the fact that the stations in the standby position which have at least partially detected the call sequence are also put in the listening state at the end of said sequence and at the same possible traffic frequency during a test interval having a time-duration $t_1$. A station which has detected a signal at said frequency during said time interval $t_1$ transmits a jamming signal to other stations of the network at the same frequency and during a time interval $t_2$ in order to indicate occupation of the corresponding frequency and a station which has not detected any signal extends the listening operation during the same time interval $t_2$.

A further distinctive feature of the invention lies in the fact that the calling station transmits the aforementioned call sequences followed by listening-in stages on stair-steps of the second frequency law until a possible frequency is free. A communication is established for the calling station by transmission at said traffic frequency and for the called stations by listening-in at the same frequency when no station has detected any signal at the end of an interval having a time-duration $t_2$.

A further object of the invention is to provide a transmitter-receiver station which serves to carry out the method of establishment of communications described in the foregoing.

Other features of the invention will be more apparent upon consideration of the following description and accompanying drawings, wherein.

The method of establishment of communications in accordance with the invention is carried out in a conference network which is protected against countermeasures in the following manner:

a traffic frequency is employed only during a period of simplex operation;

each frequency is selected from a pseudorandom law of frequencies known as a free-frequency search law $L_R$ which is generated simultaneously in all the stations of the network;

the call messages generated by a calling station for establishing a communication are transmitted in frequency diversity on the basis of another pseudorandom law of frequencies known as the standby law $L_V$ which is generated simultaneously in all stations. Thus the traffic frequency is not employed prior to commencement of useful communication.

All the transmitter-receiver stations of the network are provided with a local clock and these stations generate the same standby law $L_V$ having a pseudorandom frequency variation for generating call messages. The time-duration $T_V$ of the frequency stair-steps of said standby law is compatible with the displacement in time which may exist between the clocks of the different stations of the network. In addition to said standby law, the stations of the network generate the same law of frequency variation $L_R$ which is synchronized with the standby law and from which a calling station searches a free frequency. The time-duration of the stair-steps of the free-frequency search law is a multiple of the time-duration of the stair-steps of the standby law, namely $T_R = NT_V$ said time-duration.

Figure 1:
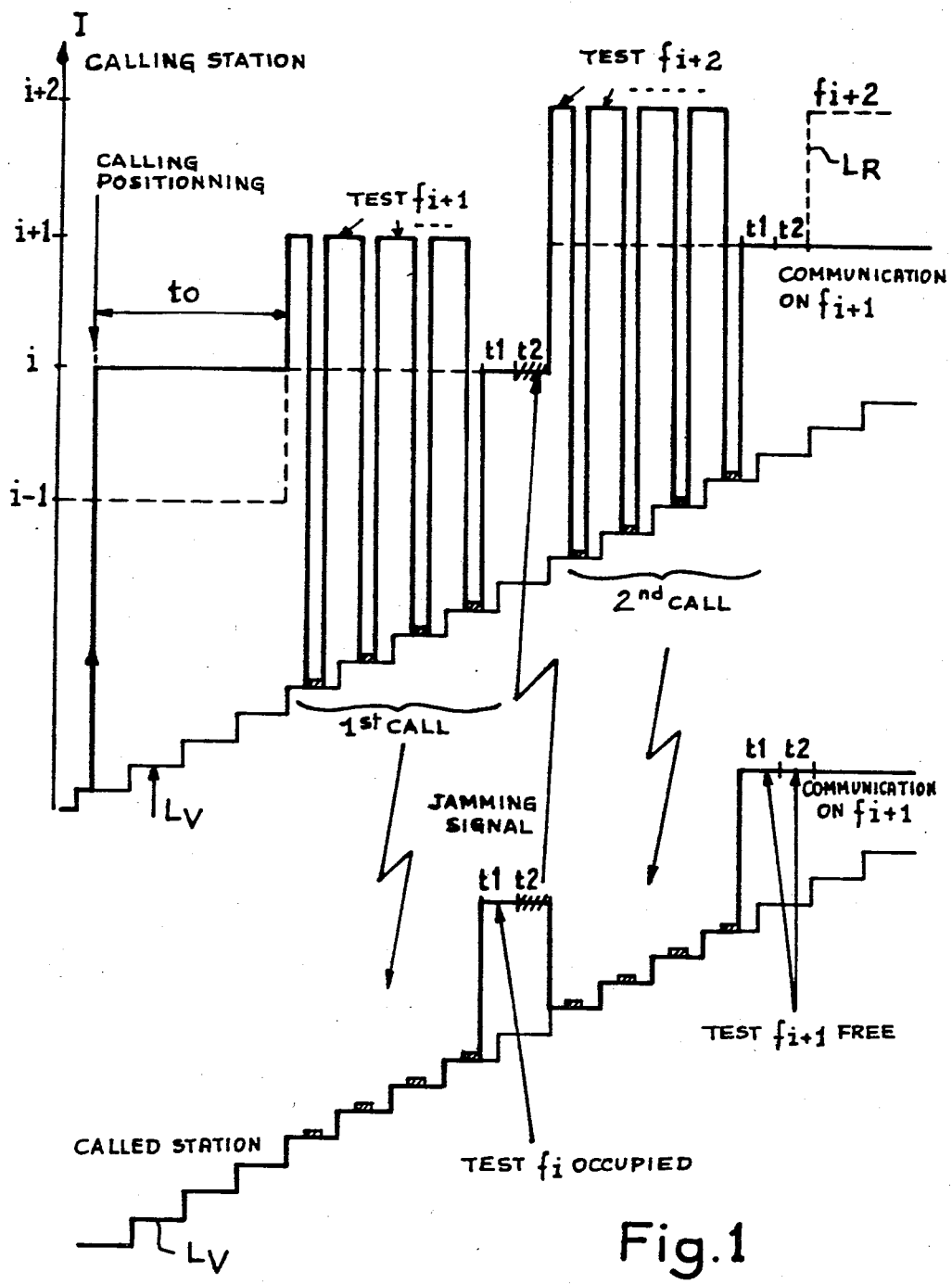
FIG. 1 is a diagram which illustrates the method according to the invention.

FIG. 1 represents the synchronized standby laws of two transmitter-receiver stations, one station being in the calling position and the other station being in the listening position, this latter being hereinafter designated as the called station. This representation indicates the order I of the stair-steps of frequencies as a function of time and not the (random) values $F_I$ of the corresponding frequencies. This figure also shows in dashed lines the free-frequency search law $L_R$ of the calling station. The frequency to be employed for a communication link is implicitly designated by the instant of access to a link connection by reason of the synchronization of the two laws.

The method of establishment of communications on the basis of these two laws is described below with reference to FIGS. 2 and 3 which show the steps involved in carrying out the method in accordance with the invention, respectively in a station in the call position and in a station in the standby state.

When there is no communication, each station of the network is in the standby or "listening-in" state on its standby law $L_V$.

When the user of a station desires to establish a communication in the network, he places the station in the calling-station position. This simplex operation takes place as shown in FIG. 1 during the stair-step of index $I=i-1$ of the search law $L_R$ of the calling station.

At this instant, the station relinquishes its standby law $L_V$ and changes to conditions of listening at the frequency $f_{I+1}$ (designated as $f_i$ in FIG. 1) of the stair-step in accordance with the frequency law $L_R$. This state prevails until the end of the corresponding stair-step of index I of said free-frequency search law, that is to say during a period $t_o$. By means of this listening-in operation, the calling station carries out a test of presumption of freedom of the frequency $f_{I+1}$ of the following stair-step of the frequency law $L_R$.

If the calling station receives a signal while being tuned to said frequency $f_{I+1}$, the result of the test for presumption of freedom at the frequency $f_{I+1}$ is negative and, during the following stair-step ($I=I+1$), the station is put under conditions of listening-in at the frequency which is associated with the following stair-step, this operation being repeated as long as the frequencies tested are not found to be free at the level of the calling station.

On the other hand, if the calling station does not receive any message during a stair-step of index I while being tuned to said frequency $f_{I+1}$, the result of the test for presumption of freedom of the frequency $f_{I+1}$ is declared to be positive. The station then transmits a call sequence on the following stair-step ($I=I+1$) of the law $L_R$. Said call sequence is formed by a series of M call messages at frequencies corresponding to the successive stair-steps of its standby law $L_V$. $M=N-1$ in the example of FIG. 1. The call messages are centered with respect to the stair-steps of the standby law and have a time-duration which is only a fraction of the time-duration of the stair-steps of said standby law $L_V$. Between two successive call messages, the calling station is put in the listening position. During these intervals, listening-in takes place at the frequency of the stair-step which has the following index of the frequency law $L_R$ in anticipation of any possible rejection by one of the called stations of the frequency $f_I$.

Figure 2:
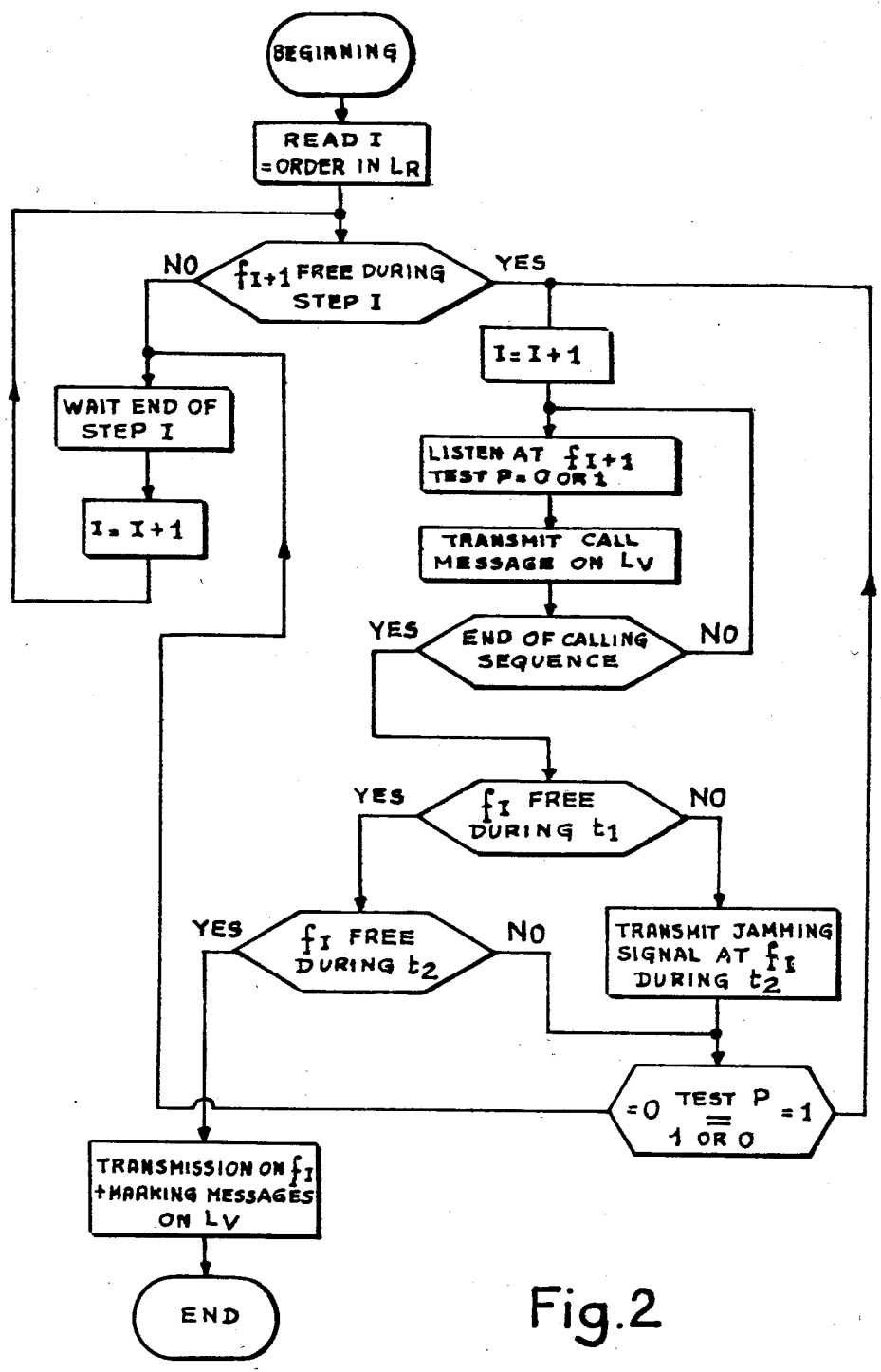
FIG. 2 is a flow diagram of the sequence utilized by a station in the call position in the method according to the invention.

An index designated as "TEST P" on the flow diagram of FIG. 2 is updated at the time of each test for presumption of freedom within the intervals between the call messages and assumes a value 1 or 0, depending on whether the following frequency $f_{I+1}$ is presumed to be free or not.

At the end of a call sequence, the calling station and all the stations of the network which have detected the call message are put in the listening position at the frequency $f_I$ corresponding to the current stair-step I of the free-frequency search law.

From this instant and for a predetermined length of time $t_1$, each station in the listening state at said frequency $f_I$ tests the environment in order to determine whether the frequency $f_I$ is free or not at its own level. If a station presumes that the frequency is free at the end of said time interval $t_1$ since it has not received any call at this frequency, the corresponding test is extended by a time interval $t_2$. On the contrary, if a message is detected at said frequency $f_I$, the frequency is occupied and the station which has thus detected this message transmits a jamming signal at the frequency $f_I$ during a period $t_2$.

In consequence, the stations which were in the listening state during the same period $t_2$ and had not detected any message during the period $t_1$ accordingly detect the jamming message and deduce therefrom that the frequency cannot be utilized for establishing the communication.

At the end of this stage, and when the first tested frequency $f_I$ is not free, the called stations are restored to the listening state in accordance with their standby law $L_V$ in order to await another call message transmitted by the calling station.

In the same manner as the other stations, the station which had the call initiative has determined that the frequency was occupied. Furthermore, the test performed by said station between the call messages at the following frequency of the next stair-step of the frequency law $L_R$ enabled it to determine whether this frequency was free or not (TEST P being respectively equal to 1 or 0). On the assumption that the frequency $f_{I+1}$ is free, the calling station then transmits a second call sequence during the following stair-step of the frequency law $L_R$ and in the same manner as before. Said calling station carries out a freedom-presumption test on the frequency associated with the following stair-step of the frequency law $L_R$ within the intervals between the call messages. If no called station has produced a jamming transmission at the frequency $f_I$ corresponding to the current stair-step of the law $L_R$ at the end of the stage formed by the aforementioned second call sequence and the stage of listening-in at said frequency $f_I$, the communication is accordingly established in the case of all stations at said frequency $f_I$. All the stations then remain at this frequency during the time interval corresponding to one period of the alternate transmission.

In the case in which the freedom-presumption test performed between the call messages has served to determine that the following frequency was occupied (TEST P=0), the calling station does not transmit any call sequence on the following stair-step of the free frequency search law but carries out during said step a continuous freedom-presumption test at the frequency corresponding to the following stair-step, as in the initial stage.

In the example shown in FIG. 1, it has been assumed that the freedom-presumption tests of the successive frequencies have been positive. On the other hand, it has been assumed that the frequency occupation test following the first call sequence has been negative since the called station has detected a signal at the corresponding frequency and emitted a jamming signal at the same frequency. This jamming signal is received by the calling station during the time interval $t_2$. The second receiving in said at least one station in standby position said possible traffic frequency at the end of the sequence of called messages whereby said possible traffic frequency at the end of said sequence of called messages determines the freedom of said possible traffic frequency from a signal during a time interval $t_1$;

transmitting a jamming signal at the same frequency and during a second time interval from a station which detected a signal in said possible traffic frequency during said first time interval $t_1$, in order to indicate occupation of said frequency and simultaneously providing for a receiving mode for receiving during said second time interval $t_2$ for any station having not detected any signal during first time interval $t_1$I.;

having said calling station retransmit said sequence of called messages after the end of said time interval $t_2$ when said possible traffic frequency is not free and subsequently receiving in another possible traffic frequency determined in accordance with said second frequency signal until said calling station locates a possible traffic frequency which is free; and having said calling station continue transmitting and the remainder of said stations receiving in said traffic frequency when said possible traffic frequency is free, in order to complete the establishment of communication.

2. A method according to claim 1 wherein at the start of each alternate transmission, a calling station transmits the sequence of called messages only if said calling station has checked that the possible traffic frequency determined by said second frequency signal is free and wherein a preliminary test is made by receiving, until the end of a time interval $t_{i-1}$ in progress according to said second frequency signal, in the frequency $f_i$ determined by said second frequency signal for the next interval $t_i$; and wherein if said frequency $f_i$ is not free, said calling station makes a second preliminary test in another possible traffic frequency $f_{i+1}$ during the next time interval $t_i$ according to the second law, said second frequency $f_{i+1}$ being determined by said second frequency signal for the time interval $t_{i+1}$, following the time interval $t_i$ wherein said preliminary tests are made successively until one of said possible traffic frequencies is found free.

3. A method according to claim 1, wherein a sequence of called messages is formed by a non-continuous series of short messages which are centered with respect to the corresponding time intervals of said first frequency signal.

4. A method according to claim 2 wherein, between the transmissions of the called messages during time interval $t_i$, the calling station makes a second preliminary test by receiving in the traffic frequency $f_{i+1}$, in order to check the freedom of said traffic $t_{i+1}$, and wherein when the frequency $f_i$ corresponding to the time interval $t_i$ in progress, turns out to be occupied, the calling station transmits the called messages during time interval $t_{i+1}$ if it has received no signal during the second preliminary test or makes a third preliminary test by receiving on a traffic frequency $f_{i+2}$ determined by said second frequency signal for its next time interval $t_{i+2}$, if it has received a signal during the second preliminary test.

5. A method according to claim 1 wherein, during a simplex transmission stage and when the communication is established, the calling station and the called stations leave the traffic frequency respectively in order to transmit and receive marking messages at frequencies given by said first frequency signal at the corresponding instants, detection of said messages being an indication that the communication continues and has not been jammed.

6. A transmitter-receiver station for the utilization of the method according to claim 1, wherein said station comprises a control circuit associated with a call-standby changeover unit, said control unit being provided with inputs connected to the outputs of a generator for producing values associated with the frequencies of the first and second frequency signals to the output of a call detector and to the output of a received signal detector, and control outputs connected to the control input of a transmit-receive switch and of a frequency synthesizer.

* * * * * call sequence is then transmitted by the calling station and a communication is established at the corresponding frequency since the following occupation test is positive.

In order to achieve a higher degree of safety in communications, all the stations (calling stations and called stations) periodically leave the established frequency respectively in order to transmit and to listen to marking messages which are positioned on the stair-steps of the standby law in the same manner as the call messages. When a called station does not detect the marking messages, this means that the communication is ended or that the connection has been jammed, in which case the station is restored to its standby law. Transmission of these marking messages also makes it possible to confirm or reject the interpretation of the jamming signals during establishment of a communication.

It has been mentioned in the foregoing that the time-duration of the stair-steps of the generated standby law is compatible with the displacement in time which may exist between the clocks of the different stations of the network. In the event of prolonged silence of the network, it is possible to apply a method of preliminary synchronization of the clocks of the different stations on the basis of standby laws having stair-step periods which vary progressively as a function of the time of silence of the network. Establishment of a communication is then effecte after said synchronization.

Figure 4:
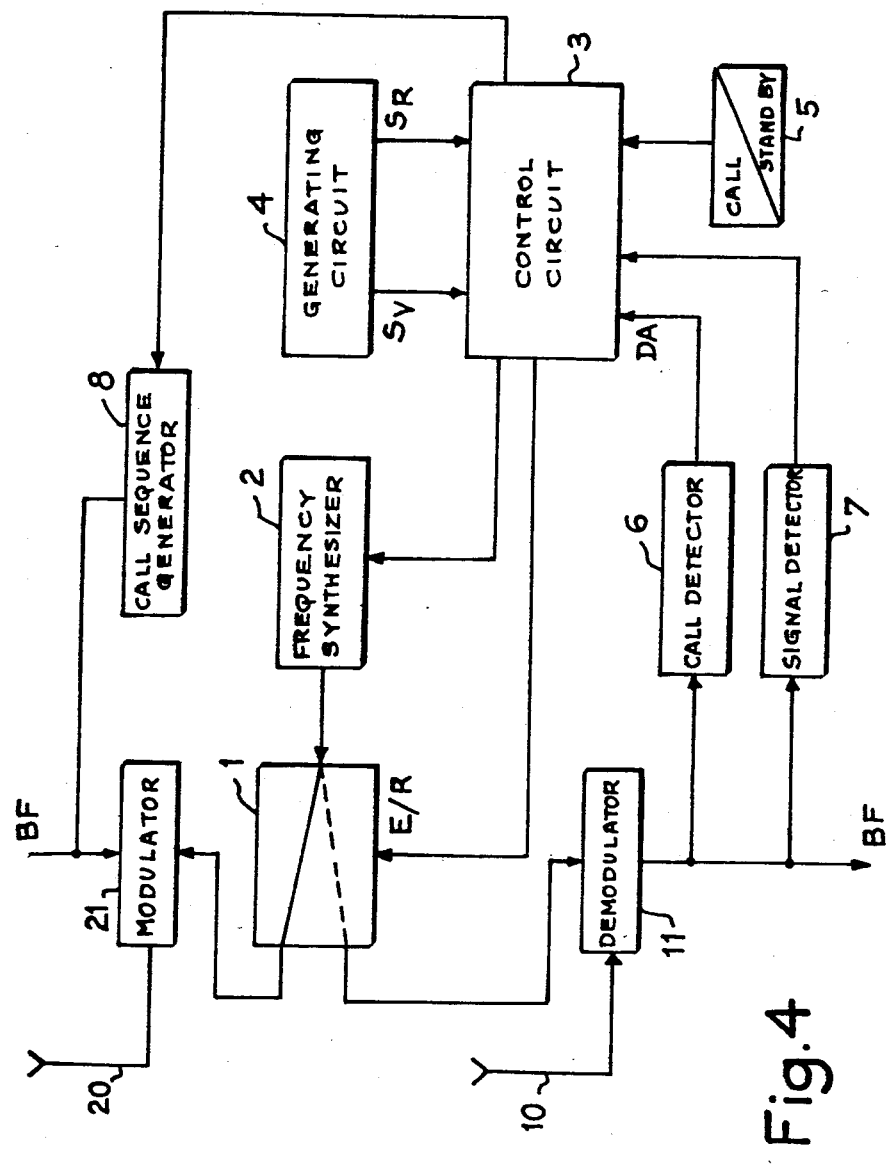
FIG. 4 is a schematic illustration of a station which serves to carry out the method according to the invention.

A transmitter-receiver station which is intended to carry out the method of establishment of communications described in the foregoing is illustrated diagrammatically in FIG. 4.

For reception purposes, the station is provided with a receiving antenna 10 connected to a demodulator 11 having a carrier signal input and a demodulated low-frequency signal output. The carrier signal input is connected to the first output of a transmit-receive switch 1 having a signal input connected to the output of a frequency synthesizer 2, and a transmit-receive control input E/R connected to one output of a control circuit 3.

For transmission purposes, the station comprises a modulator 21, the signal input of which receives a low-frequency signal to be transmitted and the carrier-signal input of which is connected to the second output of the switch 1. The output of said modulator is connected to the transmission antenna 20. The frequency synthesizer 2 is also controlled by the control circuit 3 on the basis of values established by a generating circuit 4. To this end, said generating circuit produces two series of pseudorandom values at the rates $T_V$ and $T_R$ which are respectively associated with the standby law $L_V$ and with the free-frequency search law $L_R$ and which are available on two outputs $S_V$ and $S_R$ of said circuit. Said outputs are connected to two corresponding data inputs of the control circuit 3.

Said control circuit further comprises a control input connected to a position-changing unit 5 for putting the station in the call position, in the standby position, or in the receiving position. The station further comprises a call detector 6, the input of which is connected to the low-frequency output of the demodulator 11 and the output of which is connected to a call detection input $D_A$ of the control circuit, and a signal detector 7 which is also connected to the low-frequency output of the demodulator and the output of which is also connected to an input of the control circuit.

In the standby position, the transmit-receive switch 1 is in the receiving position except during the interval $t_2$ which follows a call detection and a listening-in period over a time interval $t_1$ at the frequency $f_j$ when a signal has been detected at said frequency at the output of the detector 7. The listening and transmission frequencies are established by the synthesizer 2 when initiated by the control circuit 3 on the basis of values associated with the standby law $L_V$ and with the free-frequency search law $L_R$.

In the call position, the switch is successively in the reception or transmission position according to the different stages of the call procedure and the result of tests performed, the associated listening-in and transmission frequencies being established by the synthesizer 2 when initiated by the control circuit 3.

For the purpose of transmitting call sequences, the station comprises a call sequence generator 8 having a control input connected to a corresponding output of the control circuit and an output connected to the low-frequency input of the modulator 21.

Figure 3:
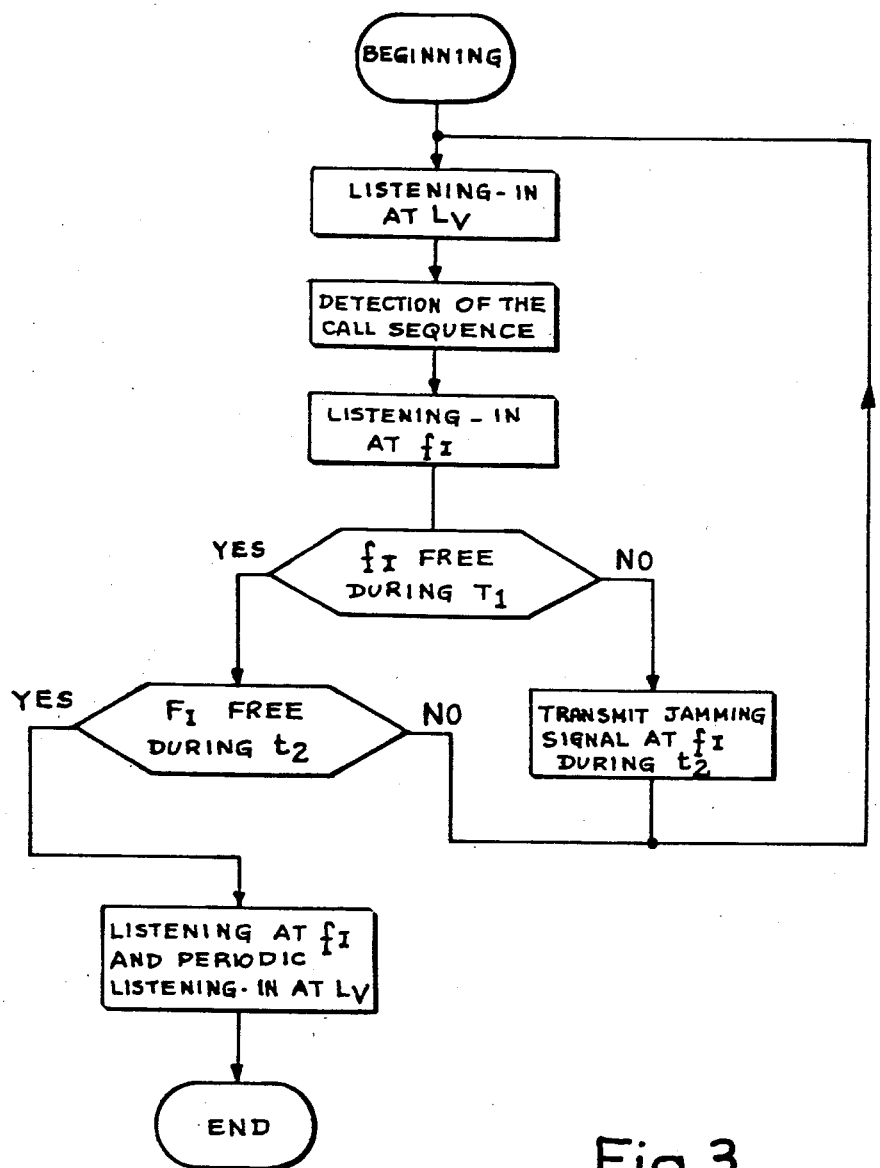
FIG. 3 is a flow diagram showing the sequence utilized by a station in the standby state in the method according to the invention.

In one embodiment of the invention, the control circuit comprises a microprocessor and the associated memory, data and program elements for carrying out the method of establishment of communications as described in the foregoing with reference to the sequences shown in FIGS. 2 and 3.

What is claimed is:

1. A method for establishing communications in a conference network of transmitter-receiver stations designed for communication by alternate simplex transmission, comprising the steps of:

generating in each of said stations a first frequency signal which is constant during each of a series of first time intervals of predetermined duration and which varies in steps in accordance with a first output of a generating circuit wherein said first output is a first series of pseudo-random values $L_V$ at a first predetermined rate corresponding to said first time intervals;

generating in each of said stations a second frequency signal which is constant during each of a series of second time intervals of predetermined duration and which varies in steps in accordance with a second output of said generating circuit wherein said second output is second series of pseudo-random values $L_R$ at a second predetermined rate corresponding to said second time intervals;

placing at least one of said stations in a standby position whereby said stations receive in accordance with said first frequency signal and wherein said stations communicate in a traffic frequency which is constant during each alternate transmission and is determined for each alternate transmission;

beginning an alternate transmission by designating a calling station which transmits a sequence of call messages in successive frequencies in accordance with said first frequency signal;

receiving in said designated calling station a possible traffic frequency which is determined by the instant in which the calling station transmits the call messages and by said second frequency signal wherein the duration of said second time intervals are a multiple of said first time intervals of said first frequency signal and wherein said second frequency signal is synchronized with said first frequency signal;